Nov. 15, 1960   R. C. STRAUSS   2,960,081
STARTER CONTROL
Original Filed Dec. 31, 1952
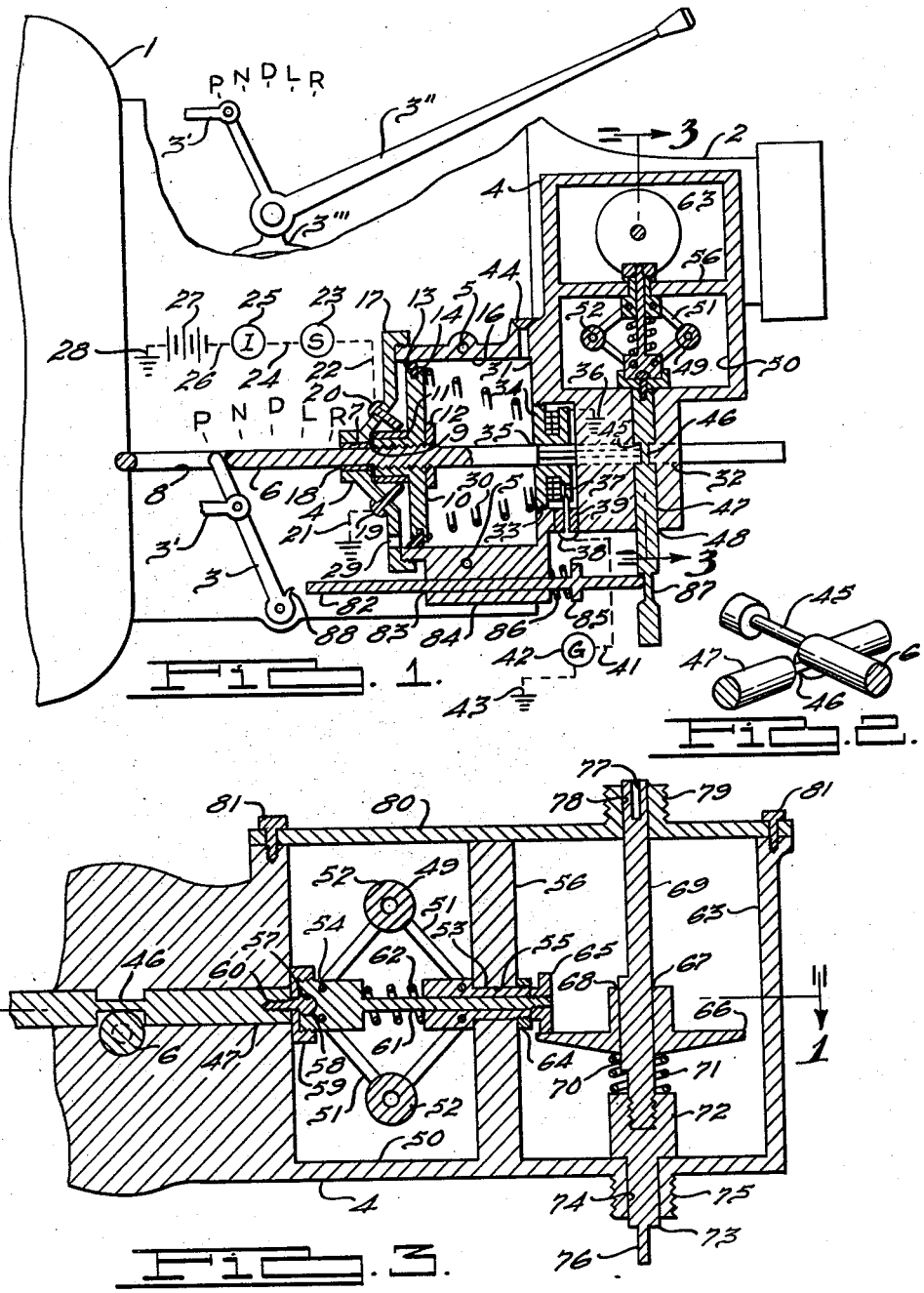
INVENTOR.
Raymond C. Strauss.
BY
Harness, Dickey & Pierce
ATTORNEYS.

United States Patent Office 2,960,081
Patented Nov. 15, 1960

2,960,081

STARTER CONTROL

Raymond C. Strauss, 933 S. Forest Ave.,
Ann Arbor, Mich.

Original application Dec. 3, 1952, Ser. No. 323,787.
Divided and this application May 18, 1956, Ser. No. 588,942

5 Claims. (Cl. 123—179)

This invention relates to motor vehicles having change speed transmissions and particularly to a device for positioning the transmission selector lever at an out-of-gear position so that the motor may be started in safety.

The principal object of this invention is to improve the construction and operation of the out-of-gear positioning and starting mechanism shown in my copending application for Letters Patent of the United States, filed October 8, 1951, Serial No. 250,334.

Another object of this invention is to provide in combination with an automatic transmission a fully automatic means for moving the selector lever of the transmission to an out-of-gear position upon stopping of the motor, first to neutral position if the wheels of the vehicle are rotating, and second to parking position if the wheels are not rotating, said automatic means being interconnected with the starter, if desired, so that with the ignition switch in an "on" position the motor will be automatically restarted and the selector lever will be immediately freed for manual return to an in-gear position such as "Drive," "Low," "Reverse."

Another object of this invention is to provide in combination with an automatic transmission a fully automatic means for moving the selector lever to an out-of-gear position upon turning of the ignition switch to "off," the movement of the selector lever being first to neutral position if the vehicle wheels are rotating, and then to parking when the wheels stop rotating, so that the driver in making maneuvers to leave the vehicle unattended may ignore the hand brake and need not manually move the selector lever to parking as a guarantee against movement of the vehicle.

Another object of this invention is to provide a vehicle movement indicator means having a solenoid with a core blocking automatic movement of the selector lever to parking and a solenoid circuit controlling switch sensitive to very slight forward or backward movement of the vehicle for holding open the solenoid circuit to prevent the automatic movement of the selector lever to parking while the vehicle is moving, and for closing said solenoid circuit when the vehicle stops, whereupon said solenoid core will withdraw from its blocking position and said selector lever will be automatically moved to parking.

Another object of this invention is to provide a vehicle movement indicator means in the form of an hydraulic pump, said pump being either the customary driveshaft driven pump built into an automatic transmission or an accessory type of driveshaft driven pump to produce a pressure for preventing the movement of the selector lever to parking as long as the vehicle is moving forwardly or backwardly and to permit through drop of pressure such movement of the selector to parking when the vehicle stops moving.

Another object of this invention is to provide a vehicle movement indicator means for not only preventing movement of the selector lever to parking while the vehicle is moving but also to prevent or restrain movement of the selector lever to reverse gear position as long as the vehicle is moving at a speed at which reverse gear selection would be damaging to the transmission so that the customary barriers built into the selector lever linkage over which the selector lever is customarily lifted to move to parking and reverse gear positions may be eliminated and the selector lever need be moved only in a lateral path directly to the selected position when the movement indicator means permits.

Another object of this invention is to provide in combination with this device a vehicle movement indicator means which permits the selector lever to be automatically moved to parking only if the vehicle is not moving or is moving at a very slow rate of speed so that damage to the driveshaft and transmission will not occur upon engagement of the parking pawl customarily built into an automatic transmission for engagement with the driveshaft.

Another object of this invention is to provide in combination with this device and the above-mentioned movement indicator means a cushioning means to cooperate with the said parking pawl of the automatic transmission to provide initial yieldability upon engagement of the paul and driveshaft to lessen the strain upon the locking parts.

Another object of this invention is to provide a governor-weight type vehicle movement indicator means of unique design whose flyweights will extend to their centrifugal limits upon vehicle acceleration more quickly and at lower vehicle speed than similar flyweights on a governor of standard construction, and in deceleration of the vehicle shall hold to the said centrifugal limits to a lower deceleration vehicle speed than the flyweights of a standard governor, thereby holding the transmission parking paul from engagement with the driveshaft to a lower speed than would a standard governor if the latter were employed in this combination.

Another object of this invention is to provide a safety feature which will prevent the manual movement of the selector lever to parking until the vehicle has come to a stop or near-stop and the motor is not operating, so that the operator will be prevented from manually engaging the parking paul under transmission damaging conditions.

Another object of this invention is to provide an automatic out-of-gear positioning device especially suitable for accessory installation wherein the built-in switch customarily connected with the shifter linkage of an automatic transmission to close the starting motor circuit is utilized by this device for automatic starting, so that the cost of a starter circuit switch may be eliminated from this device.

Another object of this invention is to provide an out-of-gear positioning device which allows the parking position of the selector lever to be at the same location as the neutral position of the lever, so that with the shifting of the transmission to a neutral position it will lock into a parked condition as soon as the vehicle stops moving, said automatic device being connectible with the starter of the vehicle for automatic operation in the neutral-parking position of the selector lever.

Another object of this invention is to provide additional methods over those shown in my copending application for Letters Patent of the United States, filed October 8, 1951, Serial Number 250,334, for withholding the device from action on the selector toward the neutral position.

Attention is hereby directed to the accompanying drawings illustrating various forms of my invention wherein like reference characters refer to like parts throughout the views:

Fig. 1 is a cross-sectional view cut along lines 1—1 in Fig. 3 of a vacuum actuated and governor controlled form of the out-of-gear positioning device shown mounted on a vehicle transmission, with the transmission selector lever separately shown in a plan view wherein it is mounted on the steering column of the vehicle in the same relative position as the shift lever of the transmission.

Fig. 2 is a fragmentary perspective view of the interlocking shafts 6 and 47 of Fig. 1.

Fig. 3 is a cross-sectional view of the governor controlling portion of the device shown in Fig. 1, cut along the lines 3—3 in Fig. 1.

Referring now to Fig. 1 there is shown fluid coupling 1 of a motor vehicle joined to automatic transmission 2 which carries power output controlling shift lever 3 for positioning the transmission at parking (as shown), wherein the vehicle is locked against movement, at neutral, drive, low, and reverse. Shift lever 3 joins flexibly through interconnecting linkage assembly 3' to the selector lever 3" mounted on the steering column of the vehicle by way of bracket 3"'. An L-shaped casting 4 is attached to the side of transmission 2 through cooperating bolts 5 in a position to align shaft 6, in bearing 32 of casting 4, with the free end of lever arm 3. Arm 3 rides in cut 8 of shaft 6 so that when driven counterclockwise through abutment with shaft 6 at an end limit of cut 8 it will be moved to parking position, and when driven clockwise through abutment with the opposite end limit of cut 8 it will be moved to the neutral position. Shaft 6 is threaded at shoulder 9 to engage piston 10, constructed of electrically non-conducting material, which carries upon its faces at their hubs electrically conducting ring 11 and magnetically responsive soft iron ring 12. Piston ring 13 snaps into groove 14 cut into the rim of piston 10 and rides against the surface of cylindrical area 16 in casting 4.

Electrically non-conducting end cap 17, threaded to engage the open end of casting 4, holds in bearing opening 7 at its axial center a bearing sleeve 18 which, in turn, receives shaft 6 and carries at an angle embedded terminal screws 19 and 20 aligned at the inner face of end cap 17 to contact electrically conducting ring 11. Terminal screw 19 is grounded at the outer face of end cap 17 through lead 21, while terminal screw 20 connects through lead 22 to the starter or starter solenoid switch 23, starter 23 being grounded through lead 24, ignition switch 25, lead 26, battery 27, and lead 28. An airport 29 is drilled in end cap 17 between the inner and outer surfaces of end cap 17 behind piston 10.

Spring 30 bears at one end on piston 10 and at the other end on end wall 31 formed in casting 4. Where bearing opening 32 in casting 4 receives shaft 6, end wall 31 is recessed and partially threaded at 33 to cooperate with threaded flange 34 of solenoid assembly 35 carried therein. One end of the winding of solenoid assembly 35 is grounded by lead 36 to casting 4, and through lead 37 attached to the opposite end of the winding contacts setscrew 38 projecting through electrically non-conducting insert 39 embedded in casting 4. Lead 41 joins setscrew 38 to generator 42 of the motor of the vehicle, lead 43 grounding the generator, so that whenever the motor of the vehicle is operating then current will pass through solenoid assembly 35 to set up attracting magnetic lines of force.

If the ignition switch 25 is now turned to "on" with piston 10 in the position shown in Fig. 1 wherein terminal screws 19 and 20 are in contact with conductor ring 11 to complete the circuit with battery 27, a current will be set up through the starter so that the motor of the vehicle will be put into operation. As soon as the motor becomes self operating, tubing connecting the manifold of the motor with threaded port 44 will cause vacuum to move piston 10 to end wall 31, compressing spring 30.

An elongated groove cut 45 encircling shaft 6 is so located that the shaft may be moved freely between reverse and neutral positions. When cut 46 on shaft 47, carried in bearing opening 48 at right angles to and partially intercepting bearing opening 32, registers with shaft 6, then shaft 6 may be moved freely and without interference into parking. As shown in Fig. 2, with the registry of cuts 45 and 46 spring 30 will be permitted to expand and drive piston 10 to seat against the end cap 17, the parking position, at which position piston 10 is shown to be in Fig. 1.

Endward movement of shaft 47 is controlled by attached governor assembly 49 mounted in routed out compartment 50 in the upwardly projecting leg of L-shaped casting 4. Governor links 51 pivotally connect weights 52 to bearing 53 and bearing 54. Bearing 53 rides in bearing opening 55 of wall 56 which is an integral part of casting 4, and bearing 54 having spherically routed out area 58, rides over ball end 57 of shaft 60. Shaft 60, threaded into larger shaft 47, is held in area 58 by apertured, threaded cap 59 cooperating with bearing 54. A shaft 61 is formed integrally with and at the axial center of bearing 54 to project through and ride in the axially drilled center of bearing 53, an expansion spring 62 being disposed on shaft 61 between bearings 53 and 54, urging 53 and 54 apart.

Upon the opposite side of wall 56 there is formed a second compartment 63 wherein bearing 53 is threaded to collar 64, and extending threaded shaft 61 is capped by centrally threaded wheel 65. A wheel of larger diameter 66 frictionally engages wheel 65 at right angles and through its apertured center 67 and guide groove 68 rides shaft 69 and spline 70 formed integrally with shaft 69. Spring 71, passed over shaft 69, bears against the lower surface of wheel 66 and against enlarged collar end 72 of shaft 73 threaded to the lower end of shaft 69, so that wheel 66 is held with constant tension against wheel 65. Shaft 73 rides in bearing opening 74 of boss 75 formed on casting 4, shaft 73 having formed on its lower end rectangular projection 76 for engagement with the speedometer takeoff shaft meshing in the customary manner with the vehicle's driveshaft, boss 75 being suitably threaded on its outer shoulder to engage a threaded collar coupling for attachment to a mating boss on the transmission through which the takeoff shaft customarily emerges.

Shaft 69 has formed at its opposite end a rectangular recessed cut 77 for the acceptance of the vehicle's speedometer cable, shaft 69 riding in bearing opening 78 of boss 79 formed in cover plate 80. Plate 80 is held to casting 4 by means of screws 81, and boss 79 is externally threaded to engage the customary coupling surrounding the vehicle's speedometer shaft housing.

With the construction here shown it will be evident that wheel 66 frictionally driving wheel 65 will have the effect of initially spinning shaft 61 at a relatively high rate of speed in relation to wheel 66 since small wheel 65 bears at the outer edge of larger wheel 66 where the takeoff effects a high ratio multiplication. Governor weights 52, consequently, will be speedily rotated to move outwardly rapidly, thereby compressing spring 62. Projecting shaft 61, induced by laterally moving bearing 54, will therefore quickly move wheel 65 toward the axial center of wheel 66 to lower the takeoff ratio and feather off the rate of acceleration for governor weights 52 as the vehicle moves faster and wheel 66 rotates faster.

With this arrangement it will be evident that as the vehicle decelerates the spring 62, in attempting to expand and thereby move small wheel 65 toward the rim of large wheel 66, will be restrained by governor weights 52 attempting to hold to their centrifugal limits due to the increasing takeoff ratio that develops as wheel 65 moves toward the rim of wheel 66, so that the conflict of forces will result in holding the governor weights 52 in a centrifugally extended or partially extended position to a much lower driveshaft speed than if an ordinary governor were driven directly from the driveshaft in the conventional manner. The effort, therefore, of the governor to remain in rapid rotation until the driveshaft has nearly stopped has the effect of holding cut 46 of shaft 47 out of registry with cut 45 of shaft 6 until the vehicle has decelerated almost to the point of stopping whereupon spring 30 will be freed to force piston 10 against end cap 17, thereby driving shaft 6 and shift lever 3 to parking position, as shown in Fig. 1.

Governor assembly 49 and shaft 47 may be further employed in this construction to prevent movement of shift lever 3 to reverse position while the vehicle is moving above a chosen minimum speed through cooperation with shaft 82 riding in bearing opening 83 of housing extension 84. Shaft 82 has formed therewith at an intermediate point on its surface collar 85, spring 86 passing over shaft 82 and bearing between housing extension 84 and collar 85. Spring 86 urges shaft 82 toward groove cut 87 in the lower end of shaft 47, so that when 82 is seated in 87 stub arm 88 attached to the pivotal end of shift lever 3 will be free for clockwise rotation into reverse gear position and will not be blocked in the movement. When shaft 47 is moved endwardly and upwardly so that shaft 82 is ejected from groove cut 87, shaft 82 will be forced toward shift lever 3 and the stub arm 88 will be blocked in its clockwise rotation, so that shift lever 3 will be unable to enter reverse gear position. This blocking situation occurs when governor 49 in rotating at speeds above approximately 5 miles per hour moves groove cut 87 away from registry with shaft 82.

In the operation of the mechanism so far described and with the mechanism in the position shown in Fig. 1, when the driver turns the ignition switch 25 to "on," current will flow through the starter circuit to start the motor of the vehicle. A vacuum condition developing in the motor upon starting will immediately cause piston 10 to compress spring 30 and shift to end wall 31 thereby breaking the starter circuit, drawing shift lever 3 from parking to neutral position, and freeing shift lever 3 for manual location at any in-gear position desired by the driver. Movement of piston 10 also moves groove cut 45 on shaft 6 to free groove cut 46 on shaft 47 for endward movement when governor assembly begins to rotate.

Self operation of the motor immediately causes the generator 42 to send an electric current through solenoid 35 to firmly hold piston 10 by means of magnetically responsive ring 12 against end wall 31, so that dropping off of vacuum through quick acceleration under motor load conditions will not cause piston 10 to move away from end wall 31. With groove cut 46 and shaft 47 free for endward movement and with the shift lever 3 at an in-gear position, movement of the vehicle either forwardly or backwardly will immediately put governor weights 52 into relatively rapid rotation to move shaft 47 and lock groove cut 46 out of registry with groove cut 45, so that even though the motor stalls while the vehicle is moving and while the governor is rotating effectively, piston 10, shaft 6, and shift lever 3 will be locked from movement into parking but will be freely manually movable between neutral and reverse, provided the vehicle is moving at speeds below 5 miles per hour when shaft 82 will be seated in groove cut 87. At speeds above 5 miles per hour shaft 82 will ride the surface of shaft 47 and stub arm 88 will be blocked by shaft 82 to prevent movement of shift lever 3 to reverse gear position.

Taking now the condition of a stalling motor while the vehicle is in movement and the governor is rotating effectively, under this condition vacuum will disappear from the manifold and generator output will stop, so that spring 30 will be free to expand to move piston 10, shaft 6, and lever 3 as far as neutral position, as which location the starter circuit will again be completed to restart the motor. Piston 10 will thereupon be drawn by the restored manifold vacuum to the end wall 31 breaking the starter circuit, and solenoid 35 will be reenergized to hold piston 10 in that position, shift lever 3 again being freed for in-gear positioning.

In the event the motor fails to restart immediately and the vehicle comes to a full stop, the governor in ceasing to rotate will then register cut 45 with cut 46, whereupon piston 10 will move to seat against end cap 17 and shaft 6 will move shift lever 3 to parking position to lock the vehicle against movement. The starter meanwhile will continue to crank the motor, and as soon as the motor again becomes self-operating, piston 10 will move to end wall 31 and shift lever 3 will be pulled from parking position to neutral position from which location it may again be manually moved to an in-gear position.

Taking now the situation where the driver brings the vehicle to a stop in anticipation of turning off the motor and leaving the vehicle, he may now, whether the vehicle is fully stopped or still in motion, turn the ignition switch 25 to "off," so that piston 10 will immediately move shaft 6 and shift lever 3 as far as neutral position and, with the halting of the vehicle completely, registry of cut 45 with cut 46 will permit piston 10 to move shaft 6 and shift lever 3 to the parking position. With this arrangement the driver has been freed of the responsibility for setting the hand brake in leaving the vehicle or manually moving the selector lever to the parking position, inasmuch as at any time the vehicle stops moving and the ignition is "off" it will be automatically put in a non-rolling locked condition. When the driver returns to the vehicle and turns the ignition switch 25 to "on" again, the motor will automatically restart and the shift lever 3 will be moved to neutral position for unresisted manual movement to an in-gear position.

On many types of automatic transmissions a barrier is placed adjacent the parking position so that the driver must first consciously lift the selector lever to clear the barrier before entering the parking position. Even so, drivers have been known to move the selector lever to parking position while the vehicle is in motion, causing the teeth of the parking pawl and cooperating driveshaft gear to be shattered. Such a danger is completely eliminated by this described mechanism since under no condition can the selector lever be manually moved to the parking position, and in fact, can only be moved by automatic means to the parking position and then only when the vehicle stops moving.

With this mechanism barrier adjacent the parking position, therefore, may safely be eliminated. Also, since the selector lever cannot be positioned at reverse above 5 miles per hour, the barrier adjacent the reverse position may likewise be eliminated, so that in handling the selector lever the driver no longer needs to lift the lever in going into reverse gear position. Though the reverse position may be locked out above any other chosen speed, 5 miles per hour is arbitrarily selected as a speed at which no severe damage will be done to the reverse gear assembly and a speed at which it is possible to effectively rock the vehicle between low and reverse when in mud or snow. If shift lever 3 is already positioned in reverse and shaft 82 is driven from groove 87 due to acceleration of the vehicle, shaft 82 will pass over stub arm 88 without contact so that shift lever 3 will remain in reverse.

Though no resistor is shown between generator 42 and solenoid 35, a resistor of approximately 3 ohms may be inserted in lead 41 to divert a substantial part of the generator output to the vehicle's battery circuit.

I claim:

1. In a vehicle having a motor and an automatic transmission with a manually operated selector lever movable to in-gear and out-of-gear positions, including a "park" position, the combination of a fluid pressure operated plunger resiliently urged to move the selector lever from an in-gear to an out-of-gear position, means during operation of the motor for holding said plunger in position wherein the selector lever may be operated manually, governor means responsive to the movement of the vehicle for preventing the plunger from moving the selector lever to a "park" position, said governor means responsive to the stopping of the vehicle for permitting the plunger to be resiliently urged to move the selector lever to a "park" position, said governor means including a first disc rotated by the driveshaft of the vehicle, a second disc frictionally engaging said first disc, said second disc endwardly slideable on its axle and normally engaging said first disc adjacent its periphery, said second disc projectable toward the hub of said first disc through the accelerating movement of a governor unit attached thereto so that said governor unit is quickly responsive to initial rotation of said first disc for rapid projection toward its hub by said second disc, and said governor unit is slowly responsive to the final rotation before stopping of said first disc to effect slow retraction of said second disc from the hub of said first disc, thereby preventing movement of said plunger to a "park" position until said driveshaft has decelerated in rotational movement to the point of stopping.

2. A safe starting device for a vehicle having a driveshaft to drive the vehicle wheels, and having a power receiving transmission for transmitting power to said driveshaft, said transmission controlled by the movement of a selector so that when selector is in a first position said transmission is operative to transmit power, when selector is in a second position said transmission is inoperative to transmit power, and when selector is in a third position said transmission is inoperative to transmit power as well as locked along with the driveshaft of the vehicle to prevent rotation of the vehicle's driven wheels, comprising a movable member, said member being adapted to drive and control said selector, first means responsive to the transition of the motor betwen operating and non-operating conditions for moving the member into driving engagement with the selector whereby said means drives the selector through said member, second means responsive to operation of the motor for moving the member out of driving engagement with the selector whereby the selector may be moved independently of said member, and third means for controlling the path of joint member and selector movement wherein the selector is resisted against movement to said third position as long as the vehicle is moving.

3. A safe starting device for a vehicle having a power receiving transmission for transmitting power to the wheels of the vehicle, including a device for locking the wheels of the vehicle against movement, said transmission controlled by movement of a selector so that when said selector is in a first position said transmission is inoperative to transmit power and the vehicle is locked by said device against movement, when said selector is in a second position adjacent said first position, said transmission is inoperative to transmit power, when said selector is in a third position adjacent said second position said transmission is also inoperative to transmit power, and when said selector is in a fourth postion adjacent said third position said transmission is operative to transmit power, a starter for the motor, a circuit for the starter, a switch in said circuit, said switch including a movable element controlling closing of said switch, said selector interconnected with said element to close said switch when said selector is in said first and second positions, and to open said switch when said selector is in said third and fourth positions, comprising an endwardly movable member, said member being adapted to move and control said selector, first means responsive to the transition of the motor between operating and non-operating conditions for moving the member into engagement with the selector whereby said means drives said selector through endward movement of said member from the direction of said fourth position to said first position, second means responsive to operation of the motor for moving the member in an oppositely endward direction to said third position wherein said selector is made free for independent movement to said fourth position, and third means for controlling the path of joint member and selector movement wherein said selector is resisted at said second position against movement to said first position as long as the vehicle is moving.

4. A safe starting device for a vehicle having a power receiving transmission for transmitting power to the wheels of the vehicle, said transmission controlled by movement of a selector so that when said selector is in a first position said transmission is inoperative to transmit power, when said selector is in a second position adjacent to said first position said transmission is inoperative to transmit power, and when said selector is in a third position adjacent to said second position said transmission is operative to transmit power, a starter for the motor, a circuit for the starter, a switch in said circuit, said switch including a movable element controlling closing of said switch, said selector interconnected with said element to close said switch when said selector is in first said position and to open said switch when said selector is in said second position and in said third position, comprising an endwardly movable member, said member being adapted to move and control said selector, first means responsive to the transition of the motor between operating and non-operating conditions for moving the member into engagement with the selector whereby said means drives said selector through endward movement of said member to said first position, and second means responsive to operation of the motor for moving the member in an oppositely endward direction to drive said selector to said second position wherein said selector is made free for independent movement to said third position.

5. In a vehicle having a motor, the combination of a power transmission adjustable to transmit power and not to transmit power, a movable selector to adjust said transmission, a movable member, said member being adapted to drive and control said selector, a first means responsive to transition of the motor between operating and non-operating conditions for moving the member into driving engagement with the selector whereby said means drives the selector through said member, a second means responsive to operation of the motor for moving the member out of driving engagement with the selector whereby the selector may be moved independently of said member, a third means responsive to operation of the motor for holding the member out of driving engagement with the selector after said second means has responded to operation of the motor.

References Cited in the file of this patent
UNITED STATES PATENTS 2,062,007   Lee  ------------------ Nov. 24, 1936